US011490132B2

(12) United States Patent
Bustamante et al.

(10) Patent No.: US 11,490,132 B2
(45) Date of Patent: Nov. 1, 2022

(54) DYNAMIC VIEWPOINTS OF LIVE EVENT

(71) Applicant: Phenix Real Time Solutions, Inc., Chicago, IL (US)

(72) Inventors: Fabián Bustamante, Evanston, IL (US); Stefan Birrer, Chicago, IL (US)

(73) Assignee: Phenix Real Time Solutions, Inc., Chicago, IL (US)

( * ) Notice: Subject to any disclaimer, the term of this patent is extended or adjusted under 35 U.S.C. 154(b) by 0 days.

(21) Appl. No.: 17/337,313

(22) Filed: Jun. 2, 2021

(65) Prior Publication Data

US 2021/0289236 A1 Sep. 16, 2021

Related U.S. Application Data

(63) Continuation of application No. 16/269,478, filed on Feb. 6, 2019, now Pat. No. 11,051,049.

(Continued)

(51) Int. Cl.
*H04N 7/16* (2011.01)
*H04N 21/2187* (2011.01)
*H04N 21/218* (2011.01)
*H04N 21/6587* (2011.01)
*G06F 3/01* (2006.01)
*H04N 21/81* (2011.01)
*H04N 21/242* (2011.01)

(Continued)

(52) U.S. Cl.
CPC ......... *H04N 21/2187* (2013.01); *G06F 3/012* (2013.01); *H04L 67/131* (2022.05); *H04N 21/21805* (2013.01); *H04N 21/2396* (2013.01); *H04N 21/242* (2013.01); *H04N 21/6587* (2013.01); *H04N 21/816* (2013.01)

(58) Field of Classification Search
CPC ......... H04N 21/2187; H04N 21/21805; H04N 21/2396; H04N 21/242; H04N 21/6587; H04N 21/816
See application file for complete search history.

(56) References Cited

U.S. PATENT DOCUMENTS 9,462,028 B1 10/2016 Levinson et al.
10,798,249 B2 * 10/2020 Lindsey ............. H04N 21/6175
(Continued)

FOREIGN PATENT DOCUMENTS

WO 2014085541 A1 6/2014
WO 2016202886 A1 12/2016

OTHER PUBLICATIONS

Int'l Search Report and Written Opinion for Int'l Application No. PCT/US19/16891, 14 pages, dated Jun. 10, 2019.

*Primary Examiner* — Gigi L Dubasky
(74) *Attorney, Agent, or Firm* — Perkins Coie LLP

(57) ABSTRACT

A method includes communicatively coupling a first client device to a platform that distributes live streams over a network to client devices. The live streams provide a live broadcast of a live event from multiple viewpoints captured by source devices including a second client device. An indication is received of a selection of a first viewpoint from the first client device and, in response, a first live stream is provided to the first client device. The first client device is caused to display a second viewpoint with a different vantage point by rendering a second live stream of a second source device. The second live stream is delayed for rendering until a beginning of a next scene of the first live stream.

18 Claims, 12 Drawing Sheets

Related U.S. Application Data

(60) Provisional application No. 62/627,126, filed on Feb. 6, 2018.

(51) Int. Cl.
    *H04N 21/239*    (2011.01)
    *H04L 67/131*    (2022.01)

(56) References Cited

U.S. PATENT DOCUMENTS

| | | | |
|---|---|---|---|
| 2006/0104600 A1* | 5/2006 | Abrams | H04N 21/25891 |
| | | | 386/230 |
| 2010/0026809 A1 | 2/2010 | Curry | |
| 2011/0119392 A1 | 5/2011 | Shamilian et al. | |
| 2011/0123972 A1* | 5/2011 | Friedman | H04N 7/18 |
| | | | 434/308 |
| 2012/0004956 A1 | 1/2012 | Huston et al. | |
| 2014/0013228 A1 | 1/2014 | Hutten | |
| 2014/0241415 A1* | 8/2014 | Su | H04N 19/142 |
| | | | 375/240.02 |
| 2015/0039726 A1 | 2/2015 | Hoffert et al. | |
| 2016/0142793 A1 | 5/2016 | Abrams | |
| 2016/0163113 A1 | 6/2016 | Lyons et al. | |
| 2016/0343037 A1* | 11/2016 | Nicholas | H04L 67/02 |
| 2016/0343045 A1 | 11/2016 | Maeda | |
| 2017/0269685 A1 | 9/2017 | Marks et al. | |
| 2017/0359624 A1* | 12/2017 | Englert | G06Q 20/123 |
| 2018/0007112 A1* | 1/2018 | Åkerfeldt | H04N 21/43072 |
| 2018/0152736 A1* | 5/2018 | Alexander | H04N 21/41407 |
| 2019/0110096 A1* | 4/2019 | Shaw | H04N 21/232 |

* cited by examiner

DYNAMIC VIEWPOINTS OF LIVE EVENT

CROSS-REFERENCES TO RELATED APPLICATIONS

This application is a continuation of U.S. patent application Ser. No. 16/269,478, filed Feb. 6, 2019, which claims the benefit of U.S. Provisional Patent Application No. 62/627,126, filed Feb. 6, 2018, each of which are incorporated herein by reference in their entirety.

TECHNICAL FIELD

The disclosed teachings relate to a platform that enables sharing an experience of attending a live event and enables interactions among participants. In particular, the disclosed teachings enable a shared experience of a live event among and between users remotely located from the live event and attendees located at the event, and can enhance a shared experience with augmented reality content.

BACKGROUND

Attending a live event such as a sports game, a seminar, a concert, or a demonstration with friends and family is a valued social activity for many people. Existing technology enables individuals that are remotely located from a live event and/or from each other to have a limited shared experience of the live event. For example, an individual that is remotely located from a live event can watch it on TV. The remotely located individual experiences a live broadcast of the event rendered on the user's television. In another example, a spectator located at a live event can share her experience with a remotely located individual by using a mobile phone to capture imagery and sound of the live event as AV signals that are streamed to a device of the individual that can render the AV signals. Therefore, a remotely located individual can share in the spectator's experience of the live event. In other words, the individual is a spectator of the spectator's experience. That is, the "sharing" of an experience is only unidirectional.

Moreover, sharing live content obtained and communicated by a mobile phone does not allow the remotely located individual to have an immersive experience as if the individual is present at the live event. Instead, the individual can only share in a spectator's experience because the individual has no control over the experience that is being provided by the spectator. Likewise, multiple remotely located individuals can only share in the experience of one or more spectators but the spectator(s) cannot share in the experience of remotely located individuals, and an experience of the same live event cannot be shared among remotely located users and/or spectators. Accordingly, existing technology does not enable remotely located individuals and local spectators to share a live event in an immersive manner as if they were all attending the live event together.

SUMMARY

The disclosed embodiments include at least one method. The method includes communicatively coupling a first client device to a platform that distributes live streams over a network to client devices including the first client device. The live streams provide a live broadcast of a live event from viewpoints captured by source devices located at the live event including a second client device. The method further includes receiving an indication of a selection of a first viewpoint from the first client device and communicating a first live stream to the first client device. The first live stream is captured by a first source device and, when rendering by the first client device, causes display of the first viewpoint on the first client device.

The disclosed embodiments also include at least one system that includes a server computer including a processor and a memory. The memory includes instructions that, when executed by the processor, cause the server computer to interconnect client devices over a network. At least some of the client devices are located at a live event and at least some of the client devices are remotely located from the live event. Further, each client device that is located at the live event is a source of a live stream that, when rendered by a device, causes a display of a viewpoint of the live event. The server computer system can be caused to dynamically update a subscription list to include any of the client devices that are currently live streaming a viewpoint of the live event and remove any of the client devices that stopped live streaming a viewpoint of the live event, and host a subscription service that enables selective access by any of the client devices to any client device on the subscription list and disables access to any client device removed from the subscription list.

The disclosed embodiments also include at least one device. An example of the device is a head mounted display (HMD) device that includes a display device, an orientation sensor, a processor, and a memory. The memory includes instructions that, when executed by the processor, cause the HMD device to render a live stream to display a viewpoint of a live event on the display device. Live streams originate at the source devices located at the live event, and the source devices may include a stationary device at a fixed location at the live event and a handheld mobile device. The HMD device is further caused to determine a change in an orientation of the HMD device based on an output of the orientation sensor, and dynamically track the change in the orientation of the HMD device to seamlessly transition from the display of the viewpoint of the live stream of the stationary device to display another viewpoint of another live stream of the handheld mobile device.

This Summary is provided to introduce a selection of concepts in a simplified form that is further described below in the Detailed Description. This Summary is not intended to identify key features or essential features of the disclosed subject matter, nor is it intended to be used to limit the scope of the disclosed subject matter. Other aspects of the disclosed subject matter will be apparent from the accompanying Figures and Detailed Description.

DETAILED DESCRIPTION

Figure 1:
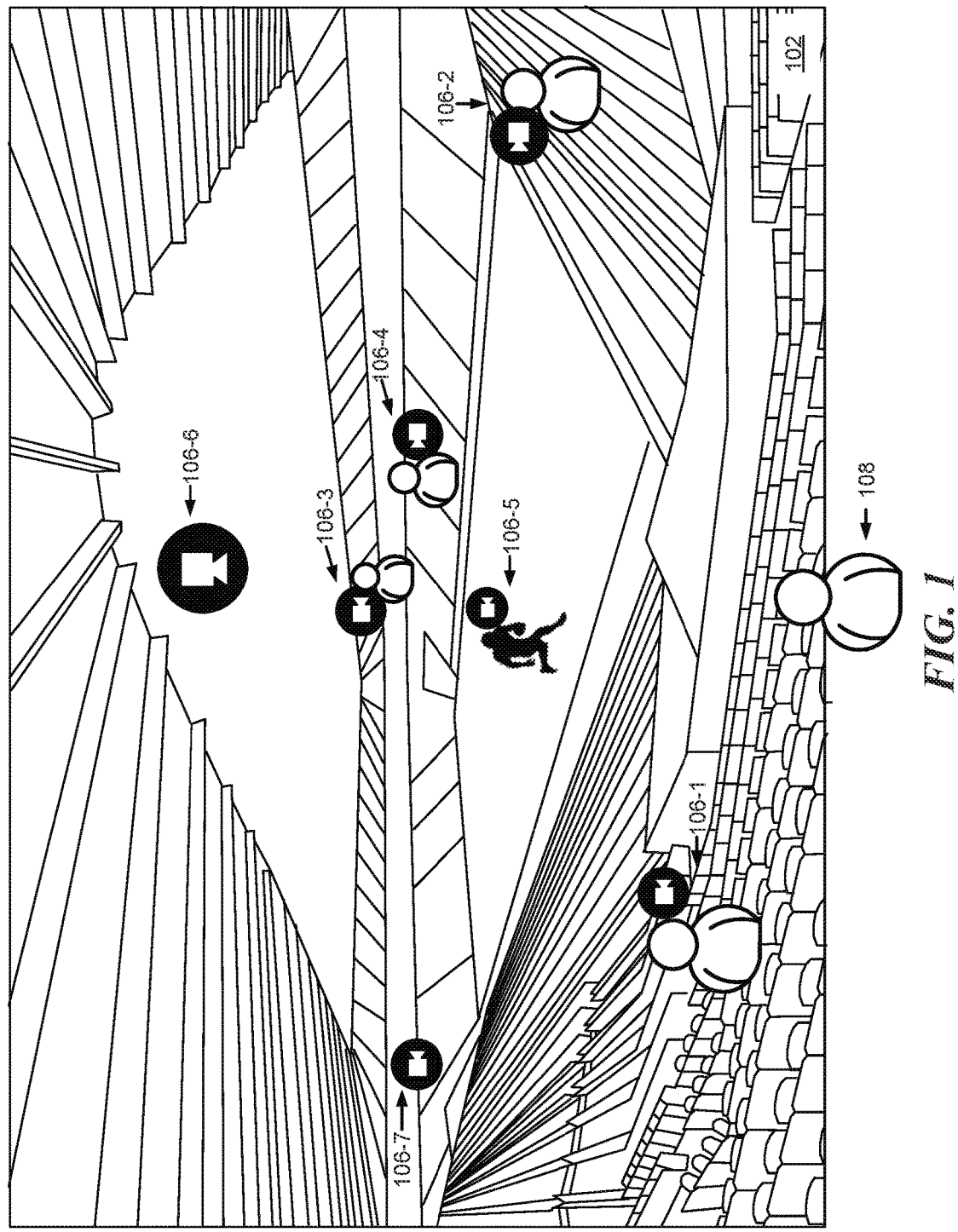
FIG. 1 illustrates a viewpoint of a live event displayed by a client device on a user interface according to some embodiments of the present disclosure.

The embodiments set forth below represent the necessary information to enable those skilled in the art to practice the embodiments and illustrate the best mode of practicing the embodiments. Upon reading the following description, in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

Definitions of Some Terms

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like, refer to actions and processes of an electronic computing device that manipulates and transforms data, represented as physical (electronic) quantities within the computer's memory or registers, into other data similarly represented as physical quantities within the computer's memory, registers, or other such storage medium, transmission or display devices.

As used herein, the terms "connected," "coupled," or variants thereof refer to any connection or coupling, either direct or indirect, between two or more elements. The coupling or connection between the elements can be physical, logical or a combination thereof.

As used herein, the term "live" or variants thereof may refer to occurring in real-time or near real-time. For example, a live event may refer to an event that is currently ongoing. A live broadcast or live transmission may refer to various types of media that are broadcast without a humanly perceptible delay. A live stream may refer to a form of online streaming of media that is simultaneously captured and broadcast in real-time or near real-time to view by an audience. In other words, a live stream refers to real-time or near real-time streaming. Hence, live streaming can offer low latency distribution of content, within the bounds of human perception of interactivity.

As used herein, a "viewpoint" may refer to a view of a live event from a vantage point at a given location in the live event and offered by a particular source device. For example, a viewpoint can be of a camera located at the northeast corner of a field.

As used herein, "augmented reality" (AR), in the context of some embodiments, may refer to a virtual object (e.g., generated virtually or virtually controlled) that overlays on a viewpoint on a scene of the real world.

Overview

Attending a live event such as a sports game, a talk, a concert or a demonstration with friends and family is a valued social activity for many people. The growth of network connectivity makes it increasingly possible for a group of people to co-attend a live event despite being physically remote from each other (e.g., in different countries or even continents). Today, sharing the experience of a live event, however, is mostly limited to a single, preordained perspective of a producer that is broadcast live to all viewers. While the perspective may change, the changes are dictated by the producer and adopted by all viewers. Thus, much of what makes a shared experience memorable such as the direct and indirect interaction with other spectators, and the side conversations, is missing.

The disclosed embodiments and associated algorithms overcome these drawbacks by enabling a shared experience of attending a live event. The disclosed embodiments include a platform and associated systems, devices, and methods that enable participants to share a simulated experience of a live real-world event. The shared experience can include simulating a local interaction at the live event. This allows for interactions between participants that are located at, or away from, the live event. For example, a remotely located participant can adopt the viewpoint of a local attendee. In some embodiments, the simulated environment incorporates live augmented reality (AR) to enhance a simulated experience. The AR features may be based on viewer preferences.

This disclosure includes details sufficient to ensure that a person skilled in the art would understand the embodiments described herein. The disclosed embodiments may be practiced without specific details or with an equivalent arrangement. In other instances, well-known structures and devices are represented as block diagrams to avoid unnecessarily obscuring embodiments of the invention. Accordingly, the present description does not focus on the particulars of computing devices, sensors and networks, including cameras, deployed around a location or attached to participants of a live event such as players in a sporting event or actors in a play, or the particulars of generating AR content associated with an event. These aspects would be understood to persons skilled in the art and, as such, are omitted here for the sake of brevity. Instead, this disclosure focuses on the protocols for simulating interactions and the timely and synchronized delivery of multiple streams associated with different viewpoints and sources of content.

The disclosed embodiments include a system that implements a platform for providing a simulated experience of a live event that can be shared among individuals that are remotely located from the live event and local attendees of the live event (collectively referred to as "participants"). The platform allows participants to interact virtually as if in the live event. In some embodiments, the platform obtains several live streams from source devices including cameras and microphones that are strategically distributed at fixed locations at the venue of a live event and mobile devices operated by participants attending the live event and/or individuals performing as part of the live event.

FIG. 1 illustrates a viewpoint 100 of a live event displayed by a client device ("first client device") on a user interface (UI) administered by the platform to simulate local interactions with other participants sharing an experience of a live event 102. In the illustrated embodiment, the live event 102 is a sports game at a stadium. The UI renders a live stream to display the viewpoint 100 of a source device located at the live event. The viewpoint 100 includes graphical icons that indicate the locations of the source devices 106 at the live event and relative to each other.

The source devices 106 broadcast different viewpoints of the same live event with respective live streams. Examples of the source devices 106 include mobile devices 106-1 through 106-5 operated by participants located at the live event, and stationary devices 106-6 and 106-7. The stationary devices 106-6 and 106-7 are depicted with camera icons that indicate a location and orientation of a camera (and microphone), which is positioned at a fixed location at the live event. In the illustrated example, the cameras are located on the ceiling of the stadium and near the seating of the stadium. Examples of the mobile devices 106-1 through 106-5 include client devices such as handheld mobile devices (e.g., smartphone, tablet computer) operated by attendees or a device attached to an individual performing in the live event (e.g., device attached to helmet/attire of a player).

The first client device that renders the viewpoint 100 is operated by a user 108, which is indicated by the user icon. The first client device can be located locally or away from the live event. As such, if the first client device is remotely located from the live event 102, the first client device simulates a local experience of the live event. If the first client device is located at a first location of the live event 102 and the viewpoint 100 is from a second location at the live event, the viewpoint 100 simulates being at the second location.

The platform can host the live streams of the source devices 106 as selectable viewpoints of the live event 102 available to client devices. To simulate the viewpoint 100, the first client device is communicatively coupled to the platform that distributes the live streams collected over the network from the source devices 106. The live streams provide the live broadcast of a live event 102 from viewpoints captured by the source devices 106. In operation, the platform receives an indication of a selection of the viewpoint 100 from the first client device and, in response, communicates a live stream of the viewpoint 100 to the first client device. Hence, the live stream is captured by a source device and, when rendering by the first client device, causes display of the viewpoint 100 on the first client device.

The platform can host a virtual interaction between the first client device (located at or away from the live event 102) and a source device that is a second client device. The client devices that are source devices publish live streams and may allow users to have live interactions with their viewers through text, audio, emoticons, etc., or can interact indirectly through other streams. For example, a publisher that broadcasts a viewpoint of a live event and other participants that are not necessarily located at the event can comment on the publisher's actions or the actions of the broadcast (e.g., perhaps in response to a publisher's poll).

Figure 2:
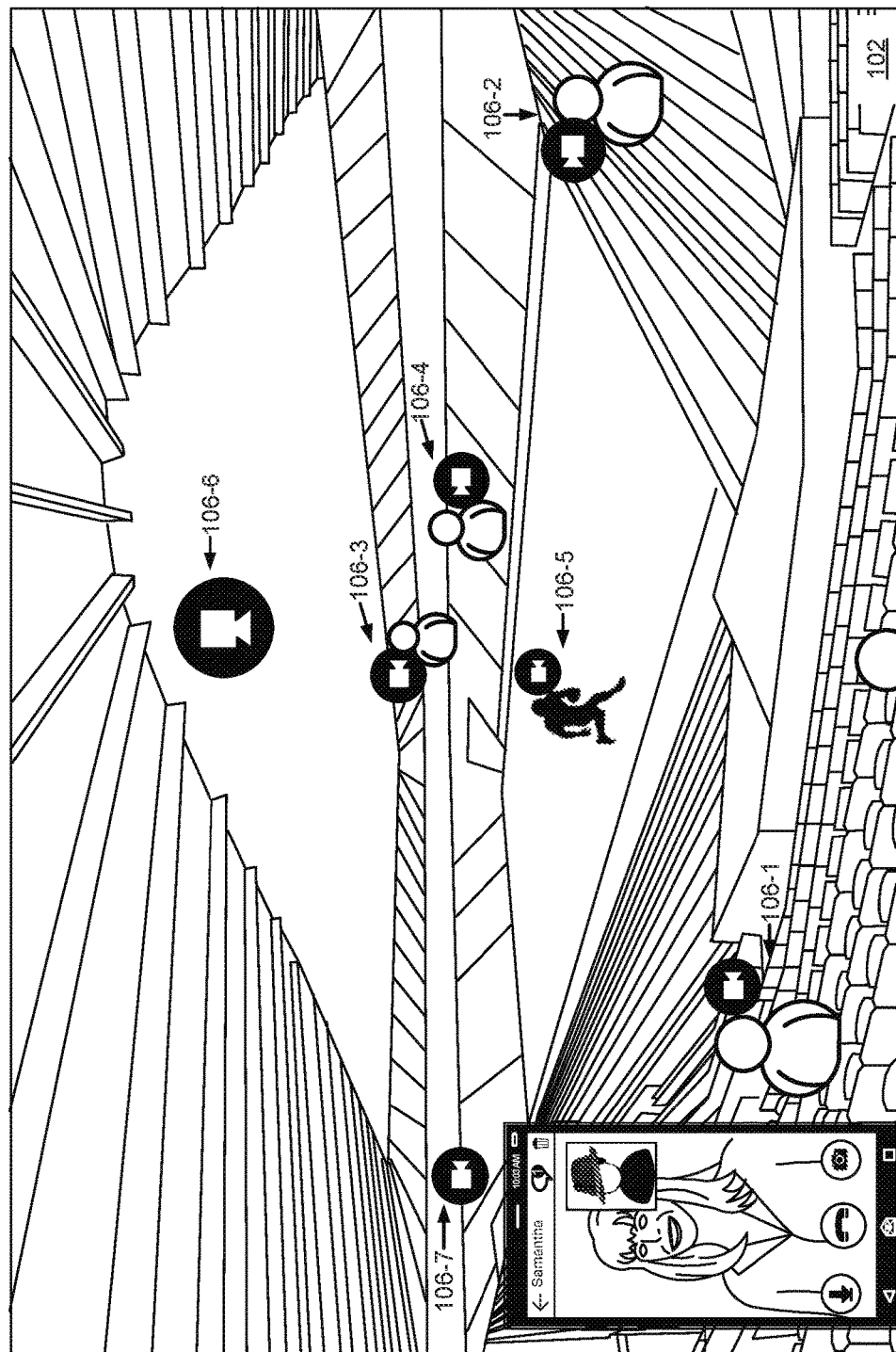
FIG. 2 illustrates a live video chat window displayed in a viewpoint of a live event according to some embodiments of the present disclosure.

For example, FIG. 2 illustrates a live video chat window 202 displayed in a viewpoint 200 of the live event 102 according to some embodiments of the present disclosure. Specifically, the viewpoint 200 is the same as the viewpoint 100 with respect to the live event 102 but incorporates the live video chat window 202. The live video chat window 202 is an example of a simulated interaction by another participant of the live event 102 with the user 108. Specifically, the user 108 interacts with the user of the source device 106-1 via the live video chat window 202, which is displayed over the viewpoint (i.e., viewpoint 100) of the source device 106-1 to produce the viewpoint 200.

In another example, a third client device can communicatively couple to the platform over the network. The first client device and the third client device may be remotely located from the live event and from each other. As such, the platform can host a virtual interaction between the first client device and the third client device where the virtual interaction simulates a local interaction despite both client devices being remotely located from the live event 102. In some embodiments, the first client device and another client device can share their respective viewpoints of the live event 102. Hence, when the first client device is located at the live event 102 and is a source device, the viewpoint offered by the first client device to another client device is different from the viewpoint 100.

Figure 3:
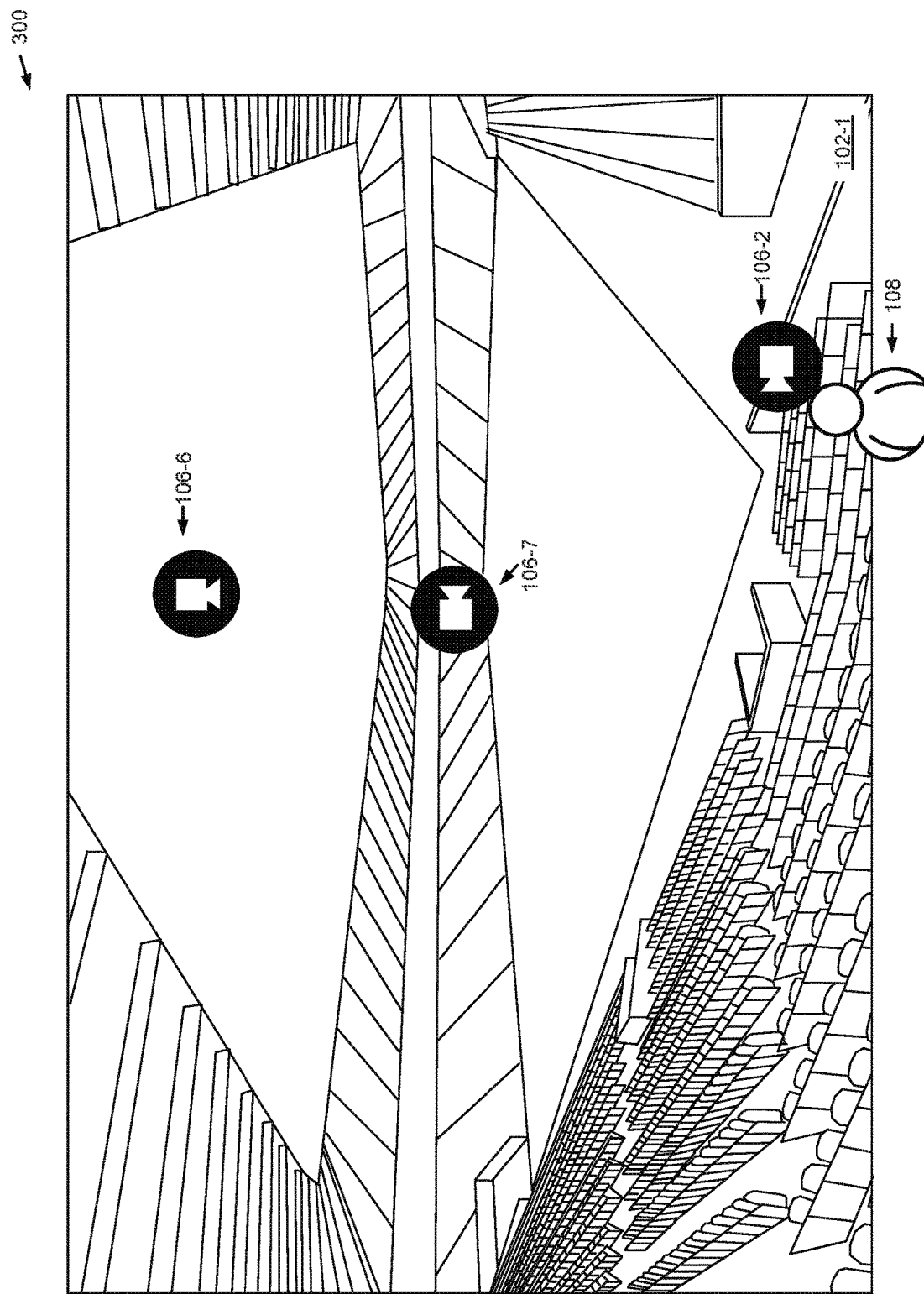
FIG. 3 illustrates adoption of another viewpoint of a live event by a client device according to some embodiment of the present disclosure.

In another example, a group of users that are remotely located from each other and/or from a live event can concurrently watch the live event and dynamically adopt (or abandon) each other's viewpoint while maintaining engaged in the live event. For example, FIG. 3 illustrates adoption of a viewpoint 300 of the live event 102 by the first client device according to some embodiments of the present disclosure. The viewpoint 300 is adopted from the source device 106-2. As such, the first client device of the user 108 is rendering the live stream from the source device 106-2 to adopt the viewpoint 300 from the perspective of the participant operating the source device 106-2.

Therefore, a virtual interaction closely simulates a local interaction at the live event 102. The immediacy of the interactions (e.g., feedback, comments) and the synchronization among live streams ensures frictionless interaction and high levels of engagement by participants. In quantitative terms, the bounds of human perception for one-way audio delays below 100 ms are considered indistinguishable from fully synchronized video, while about a 150 ms audio delay may be considered an acceptable lower bound in verbal communication. The embodiments disclosed herein implement these considerations to enable synchronized consumption of multi-source or single-source digital data among a group of users.

Augmented Reality Viewpoint

The platform allows participants to experience viewpoints of a live event that incorporate augmented reality (AR) content to produce "AR viewpoints." The AR content may be supplied by anyone including third-parties to enhance a shared experience. For example, the platform may receive an indication of a selection of AR content from the first client device. Responsive to the indication, the platform can augment the live stream with the AR content that, when rendered by the first client device, causes the first client device to display the AR content superimposed on the viewpoint of the live stream. Thus, an unmodified viewpoint of the live stream can be enhanced with AR content. The platform can also automatically augment a live stream with AR content that, when rendered by the first client device, displays an AR viewpoint.

The AR content may be live or pre-recorded AR content associated with the live event. Examples of AR content include live commentary, player statistics, curated content from other participants, advertisements, information about the live event or venue, location-based information, or combinations thereof. For example, participants can subscribe to AR content created by third-parties and delivered by the platform as AR-content embedded in live streams. As such, a live event experienced by a participant is enriched with the AR content.

Figure 4:
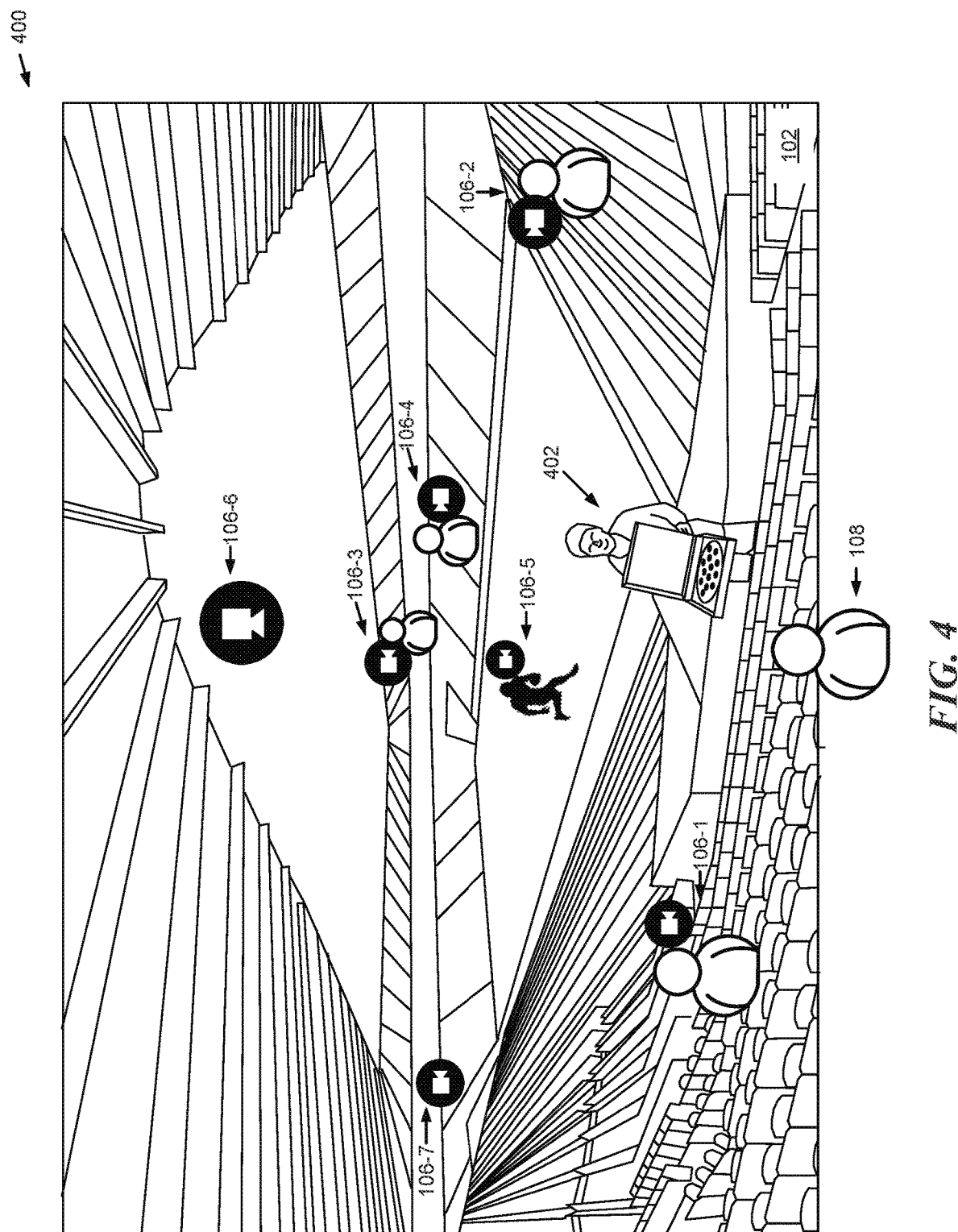
FIG. 4 illustrates augmented reality (AR) content incorporated in a viewpoint according to some embodiments of the present disclosure.

FIG. 4 illustrates a viewpoint 400 of a rendered live stream incorporating an example of AR content displayed to enhance the simulated experience of a live event according to some embodiments of the present disclosure. Specifically, the viewpoint 400 is the same as the viewpoint 100 with respect to the live event 102 but incorporates the AR content 402. In the illustrated example, the user 108 is presented with the AR content 402, which is rendered as a virtual merchant offering pizza for purchase in the viewpoint 400. The virtual merchant is not at the live event 102 and, hence, not included in the original unmodified live stream that provides the viewpoint 100. Nevertheless, the merchant appears in the viewpoint 400 as if the interaction with the merchant is real and occurring at the live event 102. Another participant that adopts the same viewpoint 100 may see the same or different AR content depending on the source of the AR content, the participant's preferences, etc.

Figure 5:
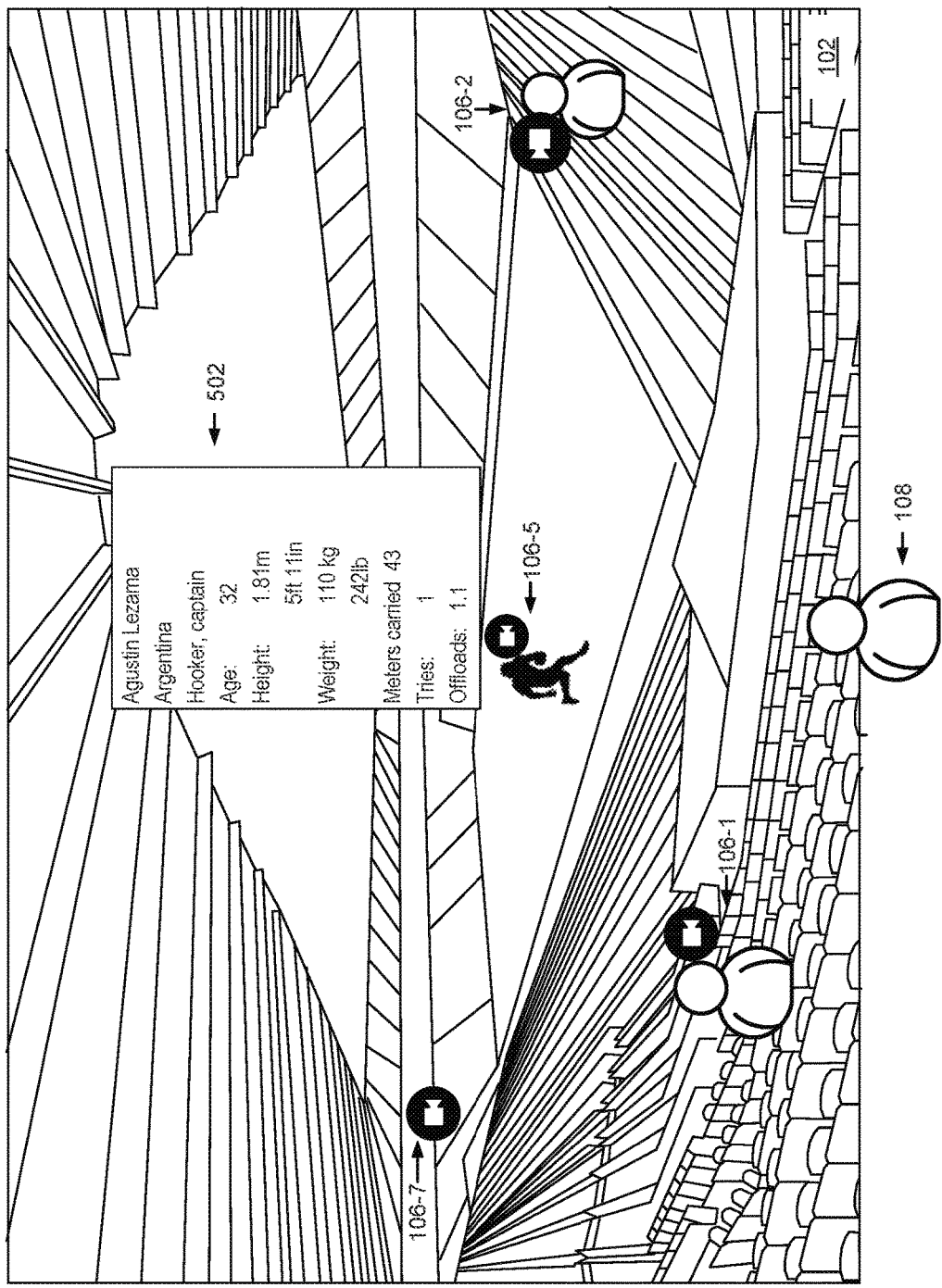
FIG. 5 illustrates another example of AR content incorporated in a viewpoint according to some embodiments of the present disclosure.

In another example, AR content could be automatically or selectively rendered to provide information about athletes of interest, a team of interest, a tournament or the state of the field. For example, a displayed viewpoint could be augmented with information about the field being wet or the existence of mild winds across the field. FIG. 5 illustrates another example of AR content incorporated in a viewpoint according to some embodiments of the present disclosure. As shown, the AR viewpoint 500 includes the AR content 502 displayed to enhance the viewpoint 100. The AR content includes information about an athlete associated with the source device 106-5 and is displayed superimposed on the viewpoint 100 of the live event 102 to render the AR viewpoint 500.

Figure 6:
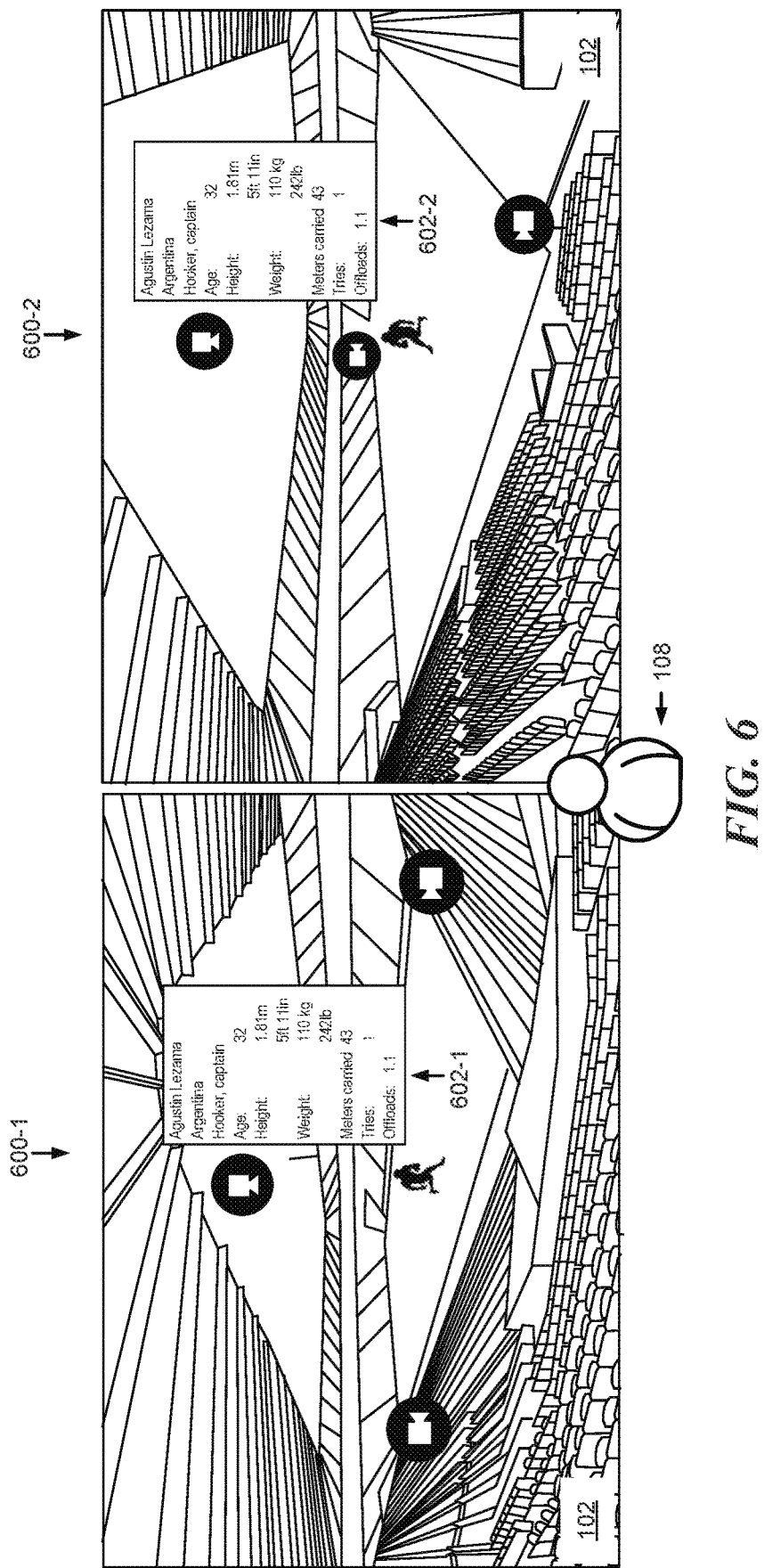
FIG. 6 illustrates different viewpoints of a live event displayed simultaneously at a client device and including AR content according to some embodiments of the present disclosure.

In some embodiments, the platform can enable a client device to simultaneously view multiple viewpoints that include the same AR content. For example, FIG. 6 illustrates different viewpoints 600-1 and 600-2 of the same live event 102 displayed simultaneously on the UI of the first client device. Each of the viewpoints 600-1 and 600-2 include the same AR content 602 from different viewpoints. Thus, the platform can combine multiple viewpoints that include the same or different AR content provided by, for example, a third party.

System Environment

Figure 7:
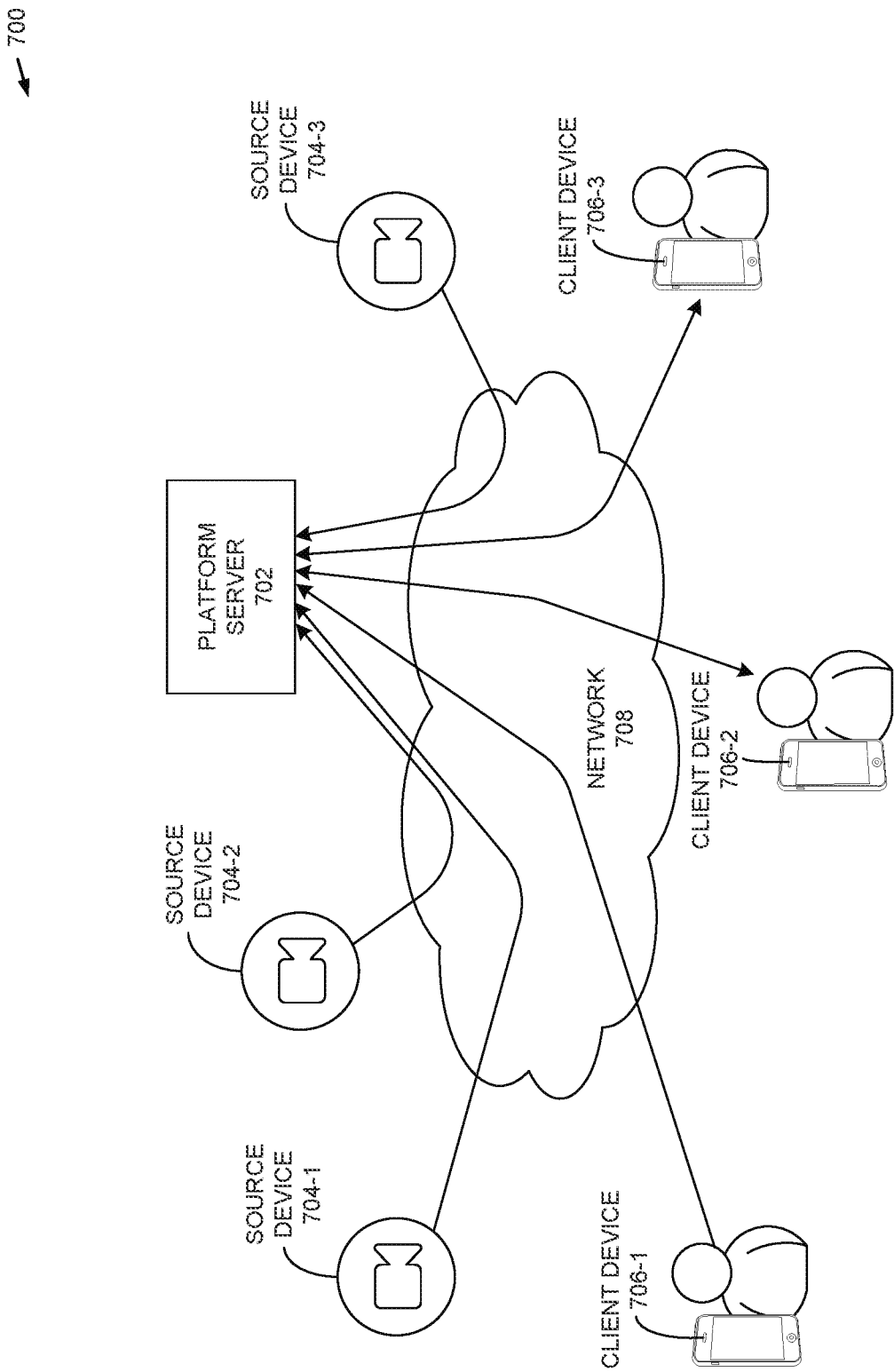
FIG. 7 is a block diagram of a system that implements a platform for sharing multiple viewpoints of a live event according to some embodiments of the present disclosure.

FIG. 7 is a block diagram of a system that implements a platform for sharing multiple viewpoints of a live event according to some embodiments of the present disclosure. The system 700 includes one or more server computers 702, dedicated source devices 704 (e.g., cameras), and client devices 706, which are interconnected over one or more networks 708 such as the Internet. As shown, the source devices 704 communicate live streams in a single direction towards the server 702. In contrast, the client devices 706 can communicate bidirectionally with each other via the server 702. That is, at least some of the client devices 706 can publish a live stream and consume live streams.

In operation, at least some of the client devices 706 are located at the live event and some are remotely located from the live event. Each of the client devices 706 that are located at the live event is a source of a live stream that, when rendered by a client device, causes a display of a viewpoint of the live event. The server 702 can dynamically update a subscription list to include the source devices 704 and any of the client devices 706 that are currently live streaming a viewpoint of the live event and remove any devices that stopped live streaming a viewpoint of the live event. The server 702 can host a subscription service that enables selective access by any of the client devices to any client device on the subscription list and disables access to any client device removed from the subscription list.

A client device that is remotely located from a live event offers a virtual presence at the live event while a client device that is located at the live event has both a physical and virtual presence at the live event. If only virtually present, a participant could have one or more devices available for engaging in the shared experience. For example, a virtual participant can experience the live event on a smartphone while away from home and use a tablet computer to experience the live event while at home. The participant can seamlessly transition from one device to the other to maintain a continuous experience of the live event.

As the participant uses different devices, the platform can seamlessly update the participant's subscribed live streams and adjusts the rendered environment by replacing or expanding the participant's views. In some embodiments, the platform can dynamically update other subscription lists such as, for example, a list of any client devices that have previously been sources of live streams to any live event. In some embodiments, the platform can enable search operations in response to a query to search, for example, for a client device that is currently live streaming a viewpoint of a live event.

The network 708 may include any combination of private, public, wired, or wireless portions. Any control information or data communicated over the network 708 may be encrypted or unencrypted at various locations or along different portions of the network 708. Each component of the system 700 may include combinations of hardware and/or software to process the data, perform functions, communicate over the network 708, and the like. For example, any component of the system 700 may include a processor, memory or storage, a network transceiver, a display, operating system and application software (e.g., for providing a UI), and the like. Other hardware or software components of the system 700 that are well known to persons skilled in the art are not shown or discussed herein for brevity.

The source devices 704 represent any electronic device from which a live stream of a live event originates. That is, the source devices 704 are sources of live streams from different viewpoints of the live event. The source devices 704 and at least some client devices 706 that can operate as source devices capture imagery and/or sounds of a live event as media that is streamed to the server 702, which synchronizes the live streams that are sharable among the client devices 706. As such, consider a live event (e.g., sports game) attended by several participants of the platform. The participants can interact with each other in the same way despite being local attendees or virtual participants.

The sources of live streams communicated to the server 702 each provide a viewpoint that can be active or inactive. For example, an inactive viewpoint may correspond to a communications channel that is currently not available for live streaming. In contrast, all active viewpoints have one or more live streams that are available for immediate consumption by the client devices 706. For example, a first client device providing a first live stream can adopt a second client device's perspective by accessing the corresponding second live stream. A request from a participant to adopt a given viewpoint can be satisfied by anyone of the sources associated with that viewpoint.

A viewpoint that is available for the client devices 706 includes media that is captured by, for example, cameras and microphones of the client devices 706. By sharing viewpoints, at least some of the client devices 706 contribute an active, unique perspective from a viewpoint of a live event that can be shared with other client devices. Besides viewpoints sourced from other client devices, and cameras or microphones placed at locations of a venue, another source of content for a live stream includes devices used by actors of the live event such as a player in a sport event (see, e.g., FIGS. 1 through 3). For example, a venue for a live event can have source devices placed at different locations and orientations to capture media for live streaming by the platform. The platform can collect the various live streams over the network 708 from each available client device or camera at a fixed location at the venue.

The client devices 706 are illustrated as handheld mobile devices used by participants to interact with the system 700. Although only three client devices 706-1 through 706-3 are shown in FIG. 7, the disclosed embodiments are not limited thereto and may include any number of handheld mobile devices. Examples of client devices include feature phones smartphones (e.g., APPLE IPHONE, SAMSUNG GALAXY, NOKIA LUMINA), tablet computers (e.g., APPLE IPAD, SAMSUNG NOTE, AMAZON FIRE, MICROSOFT SURFACE), and any other device that can access the server 702 over the network 708.

As indicated above the platform can be hosted by the server 702, which may include any number of server computers that facilitate interactions among the client devices 706 to obtain live streams of a live event captured from the source devices 704 or other client devices 706. In some embodiments, the server 702 administers the platform as a service that is accessible by the client devices 706. For example, a mobile app administered by the server 702 may provide a UI displayed on the client devices 706. The UI can be used to access the live streams of the live event.

Therefore, the platform facilitates sharing of a live event among participants by enabling virtual interactions between participants on the client devices 706. For example, the client devices 706 can communicate with each other over the platform by sharing content from a certain viewpoint of the live event. A client device can also adopt the viewpoint of another participant. Hence, the client devices 706 can share information and perspectives that enable a virtual shared experience of the same live event despite the participants not being physically together. Moreover, the shared experience can be augmented with third-party AR content to create an augmented reality environment for an enriched experience as described above.

The platform can define a viewer group, which is a set of users that, at a given point in time, subscribed to the same augmented, shared experience of a given live event such as a group watching a game or attending a play. The composition of viewer groups can change dynamically, as users join or leave a shared space. In some embodiments, the platform can restrict the access of certain live streaming content or third-party content. For example, the platform can define viewer groups with restricted access to private live streams and define public live streams with unrestricted access. In some embodiments, the platform can set an access level for each live stream. A private level may grant limited access to only some client devices. A public level may grant unrestricted access for any client device. The access to a viewpoint may be restricted by its publisher to, for example, a list of individuals such as close friends in some third-party social network that offers a public interface.

The client devices 706 can subscribe to live streams of viewpoints that are active and available as a service of the platform. In some embodiments, a subscription service may include a list of client devices that are currently live streaming a particular live event or a list of participants that regularly live stream events. As such, a spectator at a live event can readily search for other spectators at the live event and subscribe to their viewpoints. In some embodiments, participants or their devices can subscribe to other client devices attending the live event and making their viewpoints available for subscription. For example, the platform may offer a list of spectators that frequent concerts. A prospective participant can request a subscription to any live streams offered by those spectators. As such, the subscribed participants can be altered to participate in a live event when the spectators offer live streaming of an event.

Therefore, any participants that are virtually present at a live event but located remote from the event are associated with, and thus necessarily adopt, at least one viewpoint of a source device corresponding to either another client device that can be mobile or a source device at a fixed location of the live event. Any local attendees of the live event can also adopt the perspective of at least one viewpoint provided by another spectator or source device at a fixed location of the live event. Further, any participants that are physically or virtually present at the live event can enhance their own experience by interacting in real-time or near real-time with other participants that are physically or virtually present at the live event, and by adopting or changing to other viewpoints.

Interactions, Changing Viewpoints, and Synchronization

As indicated above, the disclosed embodiments enable virtual interactions among participants of a live streamed event as though the participants are naturally interacting while present together at the live event. To do so, the virtual interactions (e.g., imagery and sound) of participants must be synchronized. Hence, at least some of the live streams should be synchronized relative to a point in time of the live broadcast of a live event. In some embodiments, the platform can define a synchronized group of live streams that include only synchronized live streams and preclude unsynchronized live streams to, for example, limit access by client devices to only the synchronized group of live streams.

Consider, for example, a scenario with two participants subscribe to a single viewpoint. The two participants may seek to discuss a current activity occurring at the live event. The two participants may receive the live streams of the same live activity at different times. For example, the time it takes for live streams to arrive at each client device from a common source may vary depending on the distances between the source and client devices and/or due to factors causing latencies. For example, a source device including a camera operated by a spectator of a sports event may offer live transmissions to subscribed viewers. A first participant may be a local spectator while a second participant is remotely located from the live event. Assuming the same means of communication at a speed bounded by the speed of light, the arrival time to the second participant is greater than the arrival time to the first participant. The difference in arrival times is further exacerbated if different means of communication with different latencies are used to communicate respective live streams. Consequently, the shared experience is impaired when multiple participants at different locations attempt to talk about a live activity when the participants receive the live streams at different time (i.e., due to unsynchronized live streams).

Similarly, for a participant to seamlessly change to/adopt another viewpoint, it is necessary to synchronize the live stream of a current viewpoint and the live stream of a new viewpoint. Consider, for example, a participant who is currently observing a live activity from a first viewpoint on one side of a venue and attempting to adopt the angle or perspective of another viewpoint on the opposite side of the venue. If these viewpoints are at different distances from the source and/or participant, the participant may experience a discontinuity in a live event when changing from the current viewpoint to a new viewpoint. For example, the participant may miss a brief activity or be caused to see the brief activity twice depending on whether a viewpoint is closer to the source and/or participant, and the medium on which the live stream is communicated. For the participant to experience both viewpoints as simultaneous perspectives or angles of the same live event, the live stream associated with the viewpoint closer to the live event could be buffered and delayed for a period required for the live stream to reach the more distant viewpoint. The delay should be set to the difference between the distances of the two viewpoints.

Figure 8:
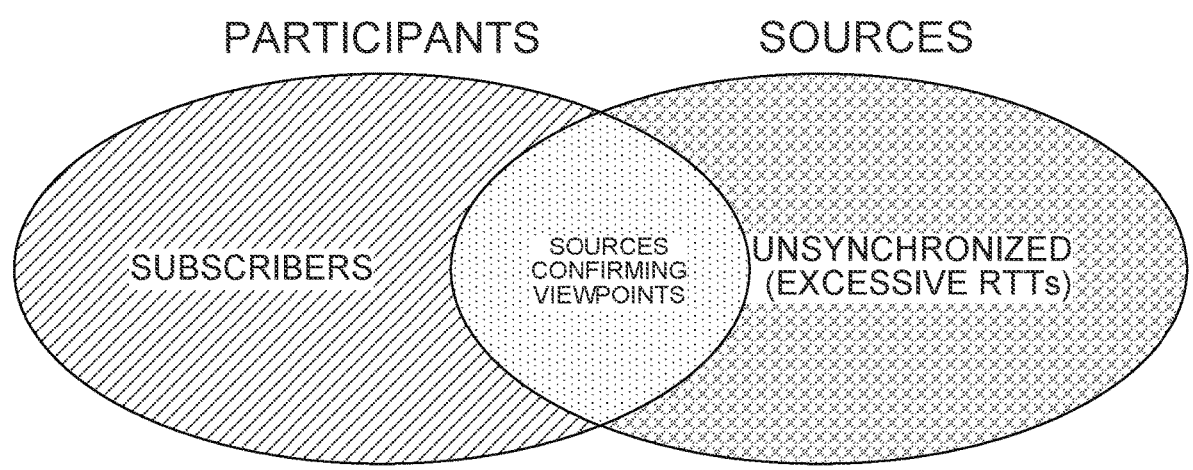
FIG. 8 illustrates relationships between users and sources of live streams of a live event according to some embodiments of the present disclosure.

FIG. 8 illustrates relationships between participants and sources of live streams of a live event according to some embodiments of the present disclosure. A group of participants are subscribers to live streams of viewpoints of a live event. A participant can subscribe to multiple viewpoints simultaneously and the platform can adapt to combine all those views. A group of cameras and others source devices can provide live streams from different viewpoints of the same live event. However, only a subset of participants overlaps a subset of sources that can be synchronized to enable natural interactions among participants for any viewpoint of those sources. This subset includes a viewer group and available viewpoints that can be treated as a single synchronized group. All the sources of the synchronized group and corresponding live streams have their clocks synchronized as described below to ensure a harmonized experience that enables natural interactions. For a source to create a new viewpoint or add to an existing viewpoint, the source must execute a clock synchronization algorithm to derive an offset between the group clock and its own local clock.

Group Clock Synchronization

Figure 9:
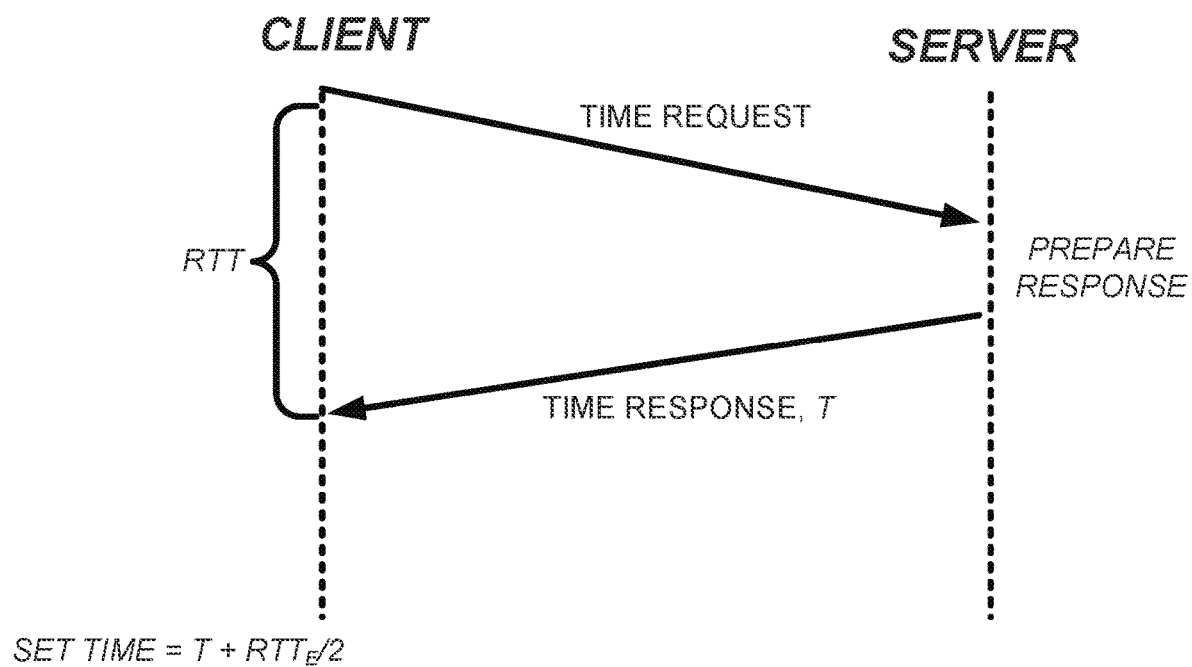
FIG. 9 illustrates a clock synchronization process between a client and a server to synchronize live streams of a live event according to some embodiments of the present disclosure.

FIG. 9 illustrates clock synchronization between a client device (C) and a time server (S) to render live streams from different sources according to some embodiments of the present disclosure. Specifically, the process for live streaming a live event may include a clock synchronization phase for multiple viewpoints to ensure a harmonized experience when interacting among participants and changing viewpoints. During a clock synchronization phase, a client contacts a "time server" and requests that server's time. After receiving the request, the server prepares a response that appends a server time (T), which may be set based on an external source such as a UTC time source. After receiving the reply including the time response, the client sets its local time equal to T+RTTe/2. RTTe refers to the round-trip time (RTT) of communication during an epoch (e). RTT is estimated as the minimum RTT from a set of exchanges between the client and the server during a previous epoch, which sets the length of an epoch to account for changing network conditions. The method, based at least in part on, for example, Cristian's time synchronization algorithm, assumes that the RTT is evenly split between communicating a request and communicating a response.

With every new epoch, a source of a viewpoint broadcasts the previous RTTe to all other sources within a given synchronized group. To maintain synchronized, all sources of all viewpoints within a given synchronized group must maintain a relatively similar RTTe. If the new RTTe of a source increases beyond a maximum value, the source must leave the synchronized group but potentially remain as a subscriber to the group. The maximum value may correspond to a minimum time that a human would be able to perceive a difference between live streams of the same live event. Given that the present embodiments do not require synchronization with an external source, depending on the applications, other algorithms could be used instead with minimal changes.

Merging or Changing Viewpoints

Figure 10:
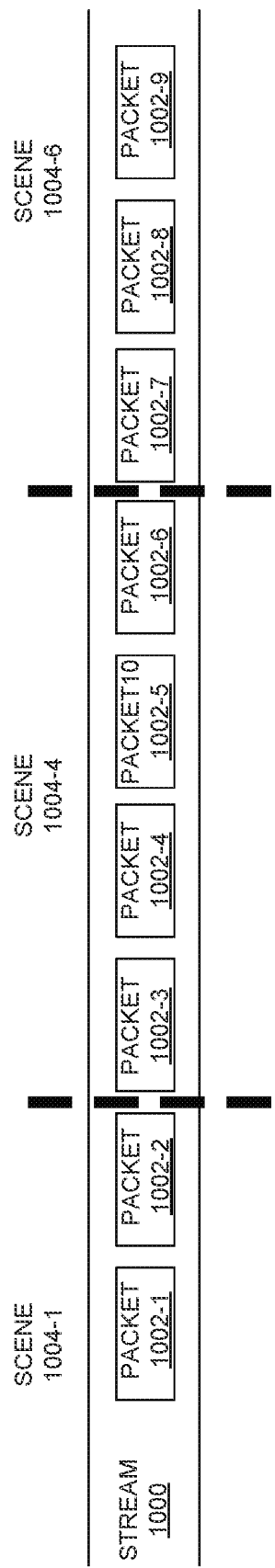
FIG. 10 illustrates a live stream composed of packets that are grouped into scenes according to some embodiments of the present disclosure.

FIG. 10 illustrates a live stream composed of packets that are grouped into scenes according to some embodiments of the present disclosure. As shown, the live stream 1000 includes packets 1002 grouped into scenes 1004 of a live event. A client device can adopt another viewpoint by rendering another live stream of another source device. The rendering of the other live stream is delayed until a beginning of a next scene of the live stream 1000. Hence, the client device can render another live stream only at a point in time defined relative to one or more of the scenes.

Specifically, the start of each scene is a discrete point in time of the live stream in which a view can change (e.g., change viewpoints, add AR content). The length of a scene in terms of a number of packets can be dynamically configured based on, for example, a per-participant basis. In some embodiments, the length of a scene matches the time taken to subscribe to a live stream. When a participant selects a viewpoint or changes viewpoints, the client-side components initiate a process to subscribe to the live stream of the desired viewpoint without terminating the current viewpoint. If the subscription process is successful, the client's view changes to the new viewpoint at the beginning of a next scene after the change was initiated, which ensures a seamless experience to a viewpoint.

In some embodiments, each scene is implemented as a DataChunk defined by a sequence of frames associated with a consumption timestamp (ConsumptionTS), where each frame includes a frame ID, a data timestamp (DataTS), and the data. The source of a live stream can send to a subscribed participant, along with a data chunk, metadata including a consumption timestamp of the server-side component that indicates when the data chunk should be rendered on the participant's viewer. As such:

$$\text{DataChunk} = \text{ConsumptionTS}\{\text{Frame}\}_1^n, \text{ where}$$
$$\text{Frame} = \text{FrameID DataTS Data}$$

When a client device receives the data chunk, it can convert the server's consumption timestamp into a consumption timestamp for the client device. If the client's consumption timestamp is in a future time relative to a current time of the client's clock, the client will wait to render (consume) the associated data chunk until its local time reaches a time that is equal to or greater than the consumption timestamp. If the data chunk arrives at the client device at a point in time different from or past the consumption timestamp, the client device may adapt the live stream to maintain synchronization or discard the data chunk.

Figure 11:
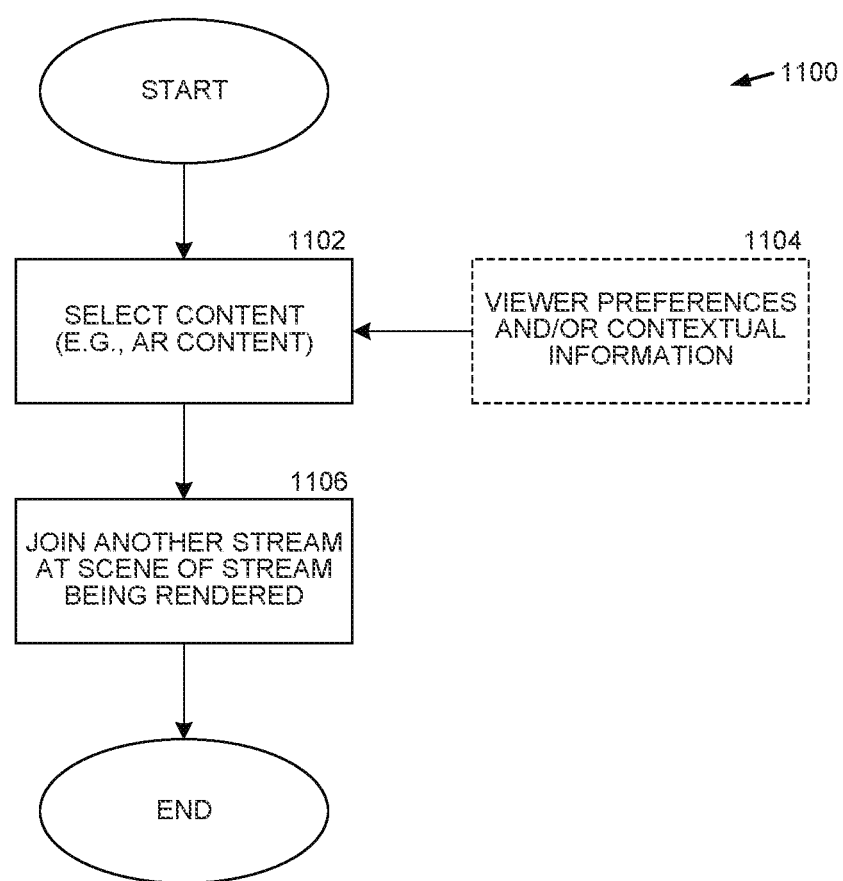
FIG. 11 is a flowchart that illustrates a process for subscribing to content for a live stream according to some embodiments of the present disclosure.

The disclosed embodiments include a process for subscribing to content such as AR content or live streams. For example, FIG. 11 is a flowchart that illustrates a process for subscribing to content for a live stream according to some embodiments of the present disclosure. In step 1102, content is selected by a participant. For example, the platform may cause a display of options on a client device for the participant to select AR content.

In optional step 1104, a live stream is tailored based on participant preferences or contextual information. For example, a user may set preferences for live commentary that the platform (or a third party) can use to automatically select and incorporate live AR content when contextually appropriate (e.g., when an athlete is in a viewpoint). Thus, when available for a live event, live commentary can be automatically incorporated in the live stream rendered by a client device. In another example, the platform can determine participant's preferences based on demographic or profile information of participant(s). For example, the platform may store a profile of a participant including preferences about live commentary. In another example, the platform includes a machine learning algorithm that automatically detects preferences based on interactions among participants or interactions with the platform, and then make suitable recommendations for incorporating content in a live stream. In some embodiments, a client device may be caused to automatically subscribe to a live stream and unsubscribe from the first live stream. As such, the participant's profile can be updated to reflect changed subscriptions or viewed content.

In optional step 1104, the content that is rendered on a client device can be selected based on contextual and/or temporal information of a live event. For example, the client-side components of the platform can receive content associated with a live event through a multicast channel. The multicast channel can be provisioned based on contextual information about the live event, the participant's interests, the participant's location, the participant's viewing device, the time of day, etc. In one example, a third-party provider provisions AR content for the platform, which delivers the content to participants of a particular age range and at a particular time of day such as an advertisement for food and beverages to adult viewers during half-time of a live football game. Hence, the AR content can be tailored differently for participants with different preferences or demographics.

In step 1106, the platform can join the selected content to a live stream at a point in time (e.g., a scene) to render on client devices. When content that is associated with a group of sources of live streams of different viewpoints of a live event, clock synchronization is required to ensure that the content is included in a desired interval of time of a live stream. In some embodiments, "wall clock" type synchronization may be sufficient for some applications.

For example, an AR stream (ARStream) of AR content (ARContent) that is incorporated in one or more live streams is composed of packets that include content (e.g., image, text) and indications of context and a time for displaying the content. For example, the indication of the time for displaying the AR content may include a specific point in time or window defined by a start time (ARTStart) and end time (ARTEnd). In some embodiments, the time window is defined in terms of a number of scenes and indicates a duration that the AR content is set for display in a viewer of a client device. The indication of the context for displaying the AR content (ARContext) may include one or more directives such as three-dimensional (3D) coordinates (ARCoord) that the client-side component of the platform can map on a viewer or specific instructions such as "floating," "bound to a billboard," etc. As such:

ARStream=ARContext ARTStart ARTEnd ARContent, where
    ARContext=ARCoord{"floating"|"billboard"
    |...}

Thus, the scenes of a live stream can be used as discrete points in time for changing viewpoints or updating views with content. For example, instead of causing an immediate change on demand, scenes of a live event can provide a natural point of interaction to make a change which, at the same time, enables a good quality of experience. A participant may request content, or another party may push content, for the participant's viewer. The delivered content may include live streams with alternate viewpoints and AR content that is added to a live stream by the client-side component of the platform and rendered on the viewer at the start time of a next scene, after the successful subscription to a live stream is associated with the content.

The disclosed embodiments also include at least one device. An example of the device is a head mounted display (HMD) device that includes a display, an orientation sensor, a processor, a memory, etc. The HMD device can render a live stream to display a viewpoint of a live event on the device. Live streams originate at source devices located at the live event. The HMD device can determine a change in an orientation of the HMD device based on an output of the orientation sensor, and dynamically track the change in the orientation of the HMD device to seamlessly transition from the display of the viewpoint of the live stream of one source device to display another viewpoint of another live stream of another source device.

In this example, sourced content can be delivered to virtual participants through the HMD device or in a virtual reality environment. For example, the platform can adapt the participant's perspective based on the participant's body position and focus of attention (e.g., perhaps leveraging other devices around the participant). For example, as the participant turns around, the HMD's display can seamlessly change the source of the live streams to a matching viewpoint. In some embodiments, the client-side components of the platform will subscribe to all necessary viewpoints to provide the immersive environment at initialization time. In some embodiments, the participant can also manually change viewpoints.

Figure 12:
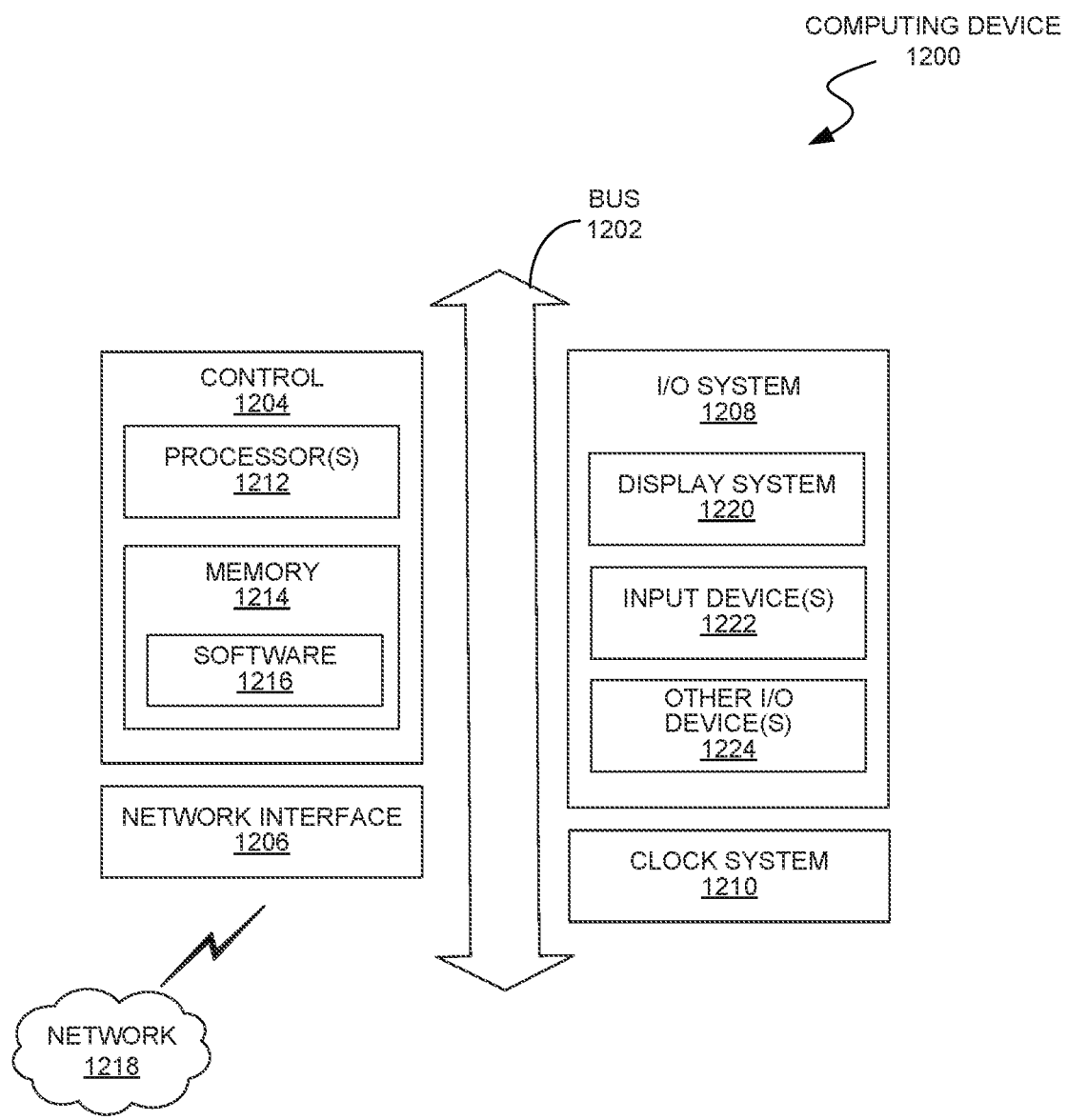
FIG. 12 is a block diagram of a computing device operable to implement aspects of the disclosed technology.

FIG. 12 is a block diagram of a computing device 1200 operable to implement at least some aspects of the disclosed technology. Examples of a computing device include a platform server, a client device, a source device, or any combinations or components thereof. The computing device 1200 may be a generic computer or specifically designed to carry out features of a system. For example, the computing device 1200 may be a SOC, a SBC system, a desktop or laptop computer, a kiosk, a mainframe, a mesh of computer systems, a handheld mobile device, or combinations thereof.

The computing device 1200 may be a standalone device or part of a distributed system that spans multiple networks, locations, machines, or combinations thereof. In some embodiments, the computing device 1200 operates as a server computer or a client device in a client-server network environment, or as a peer machine in a peer-to-peer system. In some embodiments, the computing device 1200 may perform one or more processes in real-time, near real-time, offline, by batch processing, or combinations thereof.

As shown, the computing device 1200 includes a bus 1202 operable to transfer data between hardware components. These components include a control 1204 (i.e., processing system), a network interface 1206, an input/output (I/O) system 1208, and a clock system 1210. The computing device 1200 may include other components not shown, nor further discussed for the sake of brevity. One having ordinary skill in the art will understand any hardware and software included but not shown in FIG. 12. The control 1204 includes one or more processors 1212 (e.g., CPUs, ASICs, FPGAs) and memory 1214 (which may include software 1216). The memory 1214 may be local, remote, or distributed and include, for example, volatile and/or nonvolatile memory.

A software program (e.g., software 1216), when referred to as "implemented in a computer-readable storage medium," includes computer-readable instructions stored in a memory (e.g., memory 1214). A processor (e.g., processors 1212) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows®, Linux®) or a specific software application, component, program, object, module, or sequence of instructions referred to as "computer programs."

As such, the computer programs typically comprise one or more instructions set at various times in various memory devices of a computer (e.g., computing device 1200) and which, when read and executed by at least one processor (e.g., processor 1212), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., the memory 1214).

The network interface 1206 may include a modem or other interfaces (not shown) for coupling the computing device 1200 to another device over the network 1218. The 1/0 system 1208 may operate to control various 1/0 devices including peripheral devices such as a display system 1220 (e.g., a monitor or touch-sensitive display) and one or more input devices 1222 (e.g., a keyboard and/or pointing device). Other 1/0 devices 1224 may include, for example, a disk drive, printer, scanner, or the like. Lastly, the clock system 1210 controls a timer for use by the disclosed embodiments.

Operation of a memory device (e.g., memory 1214), such as a change in state from a binary one to a binary zero (or vice versa), may comprise a perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms, and that the disclosure applies equally regardless of the particular type of machine or computer-readable media used to actually effect the distribution.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method comprising:
synchronizing at least some of a plurality of live streams relative to a point in time of a live broadcast of a live event;
defining a synchronized group of live streams to include any synchronized live streams and preclude any live streams that are not synchronized to the point in time;
limiting access by any of a plurality of client devices to the synchronized group of live streams;
removing a desynchronized live stream from the synchronized group of live streams upon determining the desynchronized live stream has a first round-trip time (RTT) that exceeds a threshold value;
communicatively coupling a first client device of the plurality of client devices to a platform that distributes the plurality of live streams over a network to the plurality of client devices, the plurality of live streams providing the live broadcast of the live event from a plurality of viewpoints captured by a plurality of source devices located at the live event including a second client device of the plurality of client devices,
wherein each viewpoint of the plurality of viewpoints includes a view of the live event captured from a vantage point of the live event;
receiving an indication of a selection of a first viewpoint of the plurality of viewpoints from the first client device;
communicating a first live stream of the plurality of live streams to the first client device, the first live stream being captured by a first source device of the plurality of source devices and, when rendering by the first client device, causes display of the first viewpoint on the first client device; and
causing the first client device to display a second viewpoint with a different vantage point of the live event from the first viewpoint of the plurality of viewpoints by rendering a second live stream of a second source device, the rendering of the second live stream being delayed until a beginning of a next scene of the first live stream.

2. The method of claim 1 further comprising:
selecting content based on a user preference or contextual information; and
causing the first client device to display the selected content.

3. The method of claim 2, wherein the user preference is included in a user profile set by a user of the first client device.

4. The method of claim 2, wherein the user preference is determined by analyzing, using a machine learning algorithm, interactions between the first client device and the platform or interactions between the first client device and the plurality of client devices.

5. The method of claim 2, wherein the contextual information includes at least one of: a current time of day, a location of the first client device, demographic information of a user associated with the first client device, or information relating to the live event.

6. The method of claim 2, wherein the selected content is augmented on the display of the second viewpoint.

7. The method of claim 2, wherein the selected content is a third live stream of a third source device, the method further comprising:
causing the first client device to stop display of the second viewpoint and to display a third viewpoint by rendering the third live stream.

8. The method of claim 1, wherein the threshold value is based at least on a second round-trip time of another live stream of the synchronized group.

9. The method of claim 1, wherein the first client device is remotely located from the live event such that the first client device simulates a local experience of the live event.

10. The method of claim 1, wherein the first client device and the first source device are handheld mobile devices.

11. The method of claim 1, wherein the first client device is located at the live event and the first source device is the second client device, the method further comprising:
hosting a virtual interaction between the first client device and the second client device, the virtual interaction simulating a local interaction at the live event.

12. The method of claim 1, wherein the first live stream and the second live stream are temporally offset from each other based on a first position of the first source device and a second position of the second source device.

13. The method of claim 1, wherein the second client device is the second source device, the method further comprising:
implementing an access restriction indicated by the second client device to limit access to the second viewpoint of the second client device to only some of the plurality of client devices.

14. The method of claim 1 further comprising:
associating a privacy level with each live stream, the privacy level including a public level that grants unrestricted access by each client device and a private level that limits access to only some of the plurality of client devices.

15. At least one computer-readable storage medium, excluding transitory signals and carrying instructions, which, when executed by at least one data processor of a system, cause the system to:
synchronize at least some of a plurality of live streams relative to a point in time of a live broadcast of a live event;
define a synchronized group of live streams to include any synchronized live streams and preclude any live streams that are not synchronized to the point in time;
limit access by any of a plurality of client devices to the synchronized group of live streams;
remove a desynchronized live stream from the synchronized group of live streams upon determining the desynchronized live stream has a first round-trip time (RTT) that exceeds a threshold value;
communicatively couple a first client device of the plurality of client devices to a platform that distributes the plurality of live streams over a network to the plurality of client devices, the plurality of live streams providing a live broadcast of the live event from a plurality of viewpoints captured by a plurality of source devices located at the live event including a second client device of the plurality of client devices,
wherein each viewpoint of the plurality of viewpoints includes a view of the live event captured from a vantage point of the live event;
receive an indication of a selection of a first viewpoint of the plurality of viewpoints from the first client device;
communicate a first live stream of the plurality of live streams to the first client device, the first live stream being captured by a first source device of the plurality of source devices and, when rendering by the first client device, causes display of the first viewpoint on the first client device;
cause the first client device to display a second viewpoint with a different vantage point of the live event from the first viewpoint of the plurality of viewpoints by rendering a second live stream of a second source device, the rendering of the second live stream being delayed until a beginning of a next scene of the first live stream;
select content based on contextual information related to the live event;
transmit the selected content to the first client device; and
cause display of the selected content on the first client device, wherein the selected content is joined to the live stream of the live event.

16. The at least one computer-readable storage medium of claim 15, wherein the selected content is augmented reality (AR) content.

17. The at least one computer-readable storage medium of claim 15, wherein:
the content includes a time window for displaying the content,
the content begins display at a start time of a next scene of the live stream, and
the start time is within the time window.

18. The at least one computer-readable storage medium of claim 15, wherein the content is selected further based on demographic information or profile information of a user associated with the first client device.

* * * * *